United States Patent
Bolduc

[15] 3,649,240
[45] Mar. 14, 1972

[54] PROCESS FOR THE PRODUCTION OF GRANULATED MATERIALS

[72] Inventor: Camillien Bolduc, 320 Thomas Pepia Street, Boucherville, Quebec, Canada

[22] Filed: Aug. 17, 1970

[21] Appl. No.: 64,510

Related U.S. Application Data

[63] Continuation-in-part of Ser. No. 614,189, Feb. 6, 1967

[52] U.S. Cl. ............................................. 71/64 DA, 23/313
[51] Int. Cl. ....................................................... C05b 19/00
[58] Field of Search ..................... 71/64 DA, 64 DC; 23/313

[56] References Cited

UNITED STATES PATENTS 2,287,759   6/1942   Handesty et al. ........................... 75/64
2,893,858   7/1959   MacDonald et al. ....................... 71/64
2,935,387   5/1960   Phillips ................................ 71/64 DC
3,523,784   8/1970   Coon .................................... 71/64 DA
3,385,660   5/1968   Dunseth .............................. 71/64 DA Primary Examiner—Reuben Friedman
Assistant Examiner—Richard Barnes
Attorney—Raymond A. Robic

[57] ABSTRACT

One or more ingredients which could be agglomerated and preferably enter into the composition of a fertilizer mixture are subjected to the action of positive external forces, such as shearing, smearing and pressing in order to superficially treat the surface thereof. The solid particles are mixed with a liquid phase such as water, nitrogeneous, phosphatic and potassic solutions and acids prior to the above treatment. Thereafter the mixture so treated is granulated, dried and cooled to give a homogeneous and uniform composition.

3 Claims, 2 Drawing Figures

PATENTED MAR 14 1972 3,649,240

INVENTOR
Camilien BOLDUC
BY
ATTORNEY

PROCESS FOR THE PRODUCTION OF GRANULATED MATERIALS

CROSS-REFERENCE

This application is a continuation-in-part of application, Ser. No. 614,189, filed Feb. 6, 1967 and now abandoned.

BACKGROUND OF THE INVENTION

1. Field of the Invention

This invention is directed to a process for the production of granulated materials. More particularly, the invention is concerned with an improved process of manufacturing complex fertilizers. Preferably, the present invention relates to an improved process for the manufacture of granulated fertilizers having an unusually high degree of uniformity of granular size and of chemical composition.

2. Description of the Prior Art

The commercially available granulated fertilizers are usually characterized by the fact that the different size particles do not possess uniformity of chemical composition. This situation may be exemplified by the following analyses made on four screen fraction of various commercially available fertilizers.

PRODUCT A

0-20-20

| Mesh | % | $P_2O_5$ | $K_2O$ |
|---|---|---|---|
| 6 | 0.8 | 23.5 | 12.6 |
| 10 | 52.6 | 22.65 | 17.2 |
| 20 | 42.9 | 15.45 | 23.2 |
| -20 | 3.7 | 18.9 | 22.5 |
| | 100.0 | | |
| Average: | | 19.44 | 19.93 |

Fraction in agreement with average analysis—
within acceptable tolerances: None.

PRODUCT B

5-20-20

| Mesh | % | N | $P_2O_5$ | $K_2O$ |
|---|---|---|---|---|
| 6 | 2.6 | 4.15 | 25.3 | 12.4 |
| 10 | 48.1 | 4.25 | 21.1 | 17.2 |
| 20 | 38.4 | 4.45 | 18.7 | 21.5 |
| 20 | 10.9 | 4.6 | 19.7 | 21.7 |
| | 100.0 | | | |
| Average | 4.41 | | 20.09 | 19.22 |

Fraction in agreement with average analysis—
within acceptable tolerances: None.

PRODUCT C

6-12-12

| Mesh | % | N | $P_2O_5$ | $K_2O$ |
|---|---|---|---|---|
| 6 | 1.1 | 6.15 | 15.55 | 8.3 |
| 10 | 63.5 | 6.35 | 14.4 | 11.4 |
| 20 | 34.1 | 6.75 | 13.0 | 14.2 |
| 20 | 1.4 | 6.2 | 13.3 | 14.0 |
| | 100.0 | | | |
| Average | 6.48 | | 13.92 | 12.36 |

Fraction in agreement with average analysis—
within acceptable tolerances: None.

This situation generally results in excessive segregation in storage bins and during handling, with correspondingly excessive variations in chemical composition and difficulty in meeting the guaranteed analyses.

The commercial processes for manufacturing $N-P_2O_5-K_2O$ fertilizers essentially comprise the following steps: screening, weighing and mixing of the solid ingredients, ammoniation-granulation, drying, cooling and classifying. The ammoniation-granulation step can be carried out in one or two operations. The ammoniation consists in reacting nitrogenous products such as anhydrous ammonia, ammonia solutions, ammonia-ammonium nitrate solutions, ammonia-ammonium nitrate-urea solutions with acidic products comprising mainly sulphuric and/or phosphoric acids, single and/or triple superphosphates. The reactions are carried out continuously or in batch mixers. The heat of reaction which is generated accelerates the agglomeration process and the formation of granules. In the prior practices, the granulation process is usually performed by cascading the particles in rotating drums or submitting the particles to the action of the pug mill's helicoidal screw device. Ammoniation is usually carried out in the same apparatus. The typical prior art practice is well exemplified by the fertilizer granulation process of the MacDonald et al., U.S. Pat. No. 2,893,858 in which the solid ingredients are agitated in either a rotary drum or a pug mill apparatus. Similarly, Hardesty et al., U.S. Pat. No. 2,287,759 also teaches that granulation may occur in a rotary drum apparatus. In these rotary or pug mill granulators, the solid particles of fertilizer are free to roll on the interior surface of the rotary cylinder and are in a relatively free condition, each ingredient having its own rate of agglomeration. The products characterized by a large range of sizes and chemical compositions, and it is therefore necessary in all commercial installations to submit these products, after proper drying and/or cooling, to an extensive classification. Both the fines and the coarse particles are returned to the first step of the process since only a narrow range of particle size is suitable for commercial purposes. It is thus necessary to recycle important quantities of materials and, for that purpose, it is common practice to have a recycling load having a volume of at least six times the volume of finished product.

It is often difficult, if not impossible, under practical operation conditions to reach equilibrium in the system and to maintain a constant chemical composition of the end products unless large quantities of fine and coarse fertilizer particles are recycled.

It is also well known that potash is particularly difficult to incorporate into the granules especially when it is in large proportion. Furthermore, potash alone cannot be agglomerated by the conventional process.

In the conventional rotary drum method of granulating fertilizers, each constituent tends to agglomerate according to a specific particular rate in a manner only slightly influenced by the presence of other constituents and mostly independent of the basic ratio of N-P-K of the fertilizer formula. As a consequence, in a conventional drum granulator, the analysis results of the particles having different sizes at the exit of the granulator are widely spread.

It has been realized that particles of different sizes and chemical compositions, as produced by the processes of the prior art, tend to segregate easily during handling and stock piling. This is a widely recognized fact in the fertilizer industry. Segregation of the particles causes errors in the product analysis, since it makes representative sampling extremely difficult and often impossible. To partly counteract the effects of segregation, it has been customary to add supplemental plant food or to overformulate the fertilizers, thus substantially increasing the product costs.

It is therefore an object of the present invention to avoid differential agglomeration of the fertilizers constituents and to produce granules showing remarkably consistent chemical compositions between particles of different sizes.

Another object of the present invention resides in the production of uniform granules and in controlling the growth of the granules of the required size.

It is yet another object of this invention to provide a uniform rate of agglomeration of all constituents.

Another object is to obtain uniformity of chemical compositions between particles of different sizes.

These and other objects according to the invention are attained in a process which comprises the mixing of at least one solid particle material with a liquid agent, submitting this mixture to the action of continuous external, combined mechanical mixing, shearing, pressing and smearing forces applied to the surfaces of the two phases to cause only superficial wetting by the liquid phase of the total surface and of all the solids. All the particles are thus completely coated with a film of liquid.

As soon as the liquid film is formed on the surface of the soluble substances, there appears a concentrated solution of that substance which, through the above forces, comes in contact with other film-coated particles and exchanges solutes. The net effect of these numerous exchanges is that in a very short period of time all particles become coated with a film of a concentrated solution of the same composition. It has been determined experimentally that the minimum time required to achieve this uniform conditioning varies from 1 to 6 minutes depending largely on the rate of solubilization of the soluble substances present in the mixture being conditioned, and the number of times the material has been submitted to the above forces. Efficient conditioning of all surfaces according to the present invention can be carried out with the aid of a wheel that is free to rotate about its axis in order to produce a friction with the material to be conditioned, with the wheel being driven mechanically around a circular path. The material to be conditioned is kept in a plane, by means of mixing plows constantly returning the material over into the path of the wheel. The action of the wheel is adjustable and there is no appreciable crushing of the particulate materials; the actual load exerted by the wheel on the materials may vary between 20–80 pounds/square inch.

The forces applied in the invention process are to be distinguished from the forces applied to the particles being treated by prior art apparatus, such as exemplified by the aforementioned MacDonald et al., and Hardesty et al. patents. In the invention process, the particles are static when the smearing and pressing forces are applied by the action of the conditioning wheel. In the rotating or pug mill apparatus of the prior art, the applied forces vary in magnitude since they act upon moving particles as such, the degree of homogeneity of agglomerated particles and the overall efficiency of granulation of these prior art apparatus are much less favorable than the homogeneity and efficiency achievable through the process of the instant invention.

After proper conditioning by the wheel, the ingredients of the invention are transferred to a rotary drum for granule formation. This step differs from the prior art in that it is much more efficient with almost 100 percent of all the particles, conditioned statically as previously described, agglomerating in the right proportion whereas, in the prior art, the agglomeration is only 10 to 20 percent, thus necessitating extensive classification and large recycling of nonagglomerated particles. Furthermore, according to the invention, the agglomerated particles have an outstanding homogeneous chemical composition.

These two latter points are exemplified in the following table by comparing a few fertilizer compositions manufactured by the prior art and by the invention process respectively.

Comparison of products as taken from granulator:

| Fertilizer Grades | Fraction on size −6 20 Tyler | | Sum of screen fractions in accordance with average chemical composition | |
|---|---|---|---|---|
|  | Invention % | Prior art % | Invention % | Prior art % |
| 0–15–30 | 97.9 | 15.2 | 99.9 | 0.0 |
| 0–20–20 | 97.9 | 16.2 | 97.9 | 0.0 |
| 2–16–6 | 91.0 | 12.6 | 99.7 | 20.7 |
| 3–12–12 | 97.7 | 12.0 | 98.2 | 45.0 |
| 4–24–20 | 97.0 | 16.8 | 95.7 | 0.0 |
| 5–20–10 | 86.8 | 12.2 | 98.3 | 0.0 |
| 6–12–12 | 94.8 | 18.9 | 94.8 | 0.0 |
| 8–16–16 | 99.1 | 15.2 | 99.1 | 0.0 |
| 10–10–10 | 97.8 | 13.2 | 99.0 | 0.0 |

The following example gives the effect of the pressure expressed in pounds per square inch on the granulation efficiency of the invention. The granulation efficiency is the percentage of particles of acceptable size after being processed by the invention process. This example is limited to two grades, viz 0–20–20 and 5–20–20:

0–20–20

| Pressure lb./sq.in. | Efficiency % |
|---|---|
| 20 | 72 |
| 40 | 93 |
| 80 | 64 (compaction) |
| 20 | 66 |
| 40 | 78 |
| 80 | 86 |

For a specific comparison between the prior art processes and the invention process which employs the application of much greater forces upon a bed of static particles, the following table is provided giving a comparison of pressure versus granulation efficiency for these processes:

| Grade | Pressure vs. granulation efficiency | | | | | |
|---|---|---|---|---|---|---|
|  | Invention process | | Drum | | Pug Mill | |
|  | lb./sq.in. | % | lb./sq.in. | % | lb./sq.in. | % |
| 0–20–20 | 40 | 93 | 3 | 52 | 10 | 46 |
| 0–15–30 | 80 | 95 | 4 | 41 | 15 | 51 |
| 5–20–20 | 80 | 85 | 4 | 62 | 12 | 54 |
| 6–12–12 | 80 | 82 | 5 | 46 | 11 | 56 |
| 10–10–10 | 40 | 91 | 4 | 49 | 12 | 44 |
| 10–20–20 | 40 | 78 | 5 | 60 | 16 | 69 |
| 16–8–8 | 40 | 82 | 5 | 46 | 14 | 49 |

Granulation efficiency is again defined as the percentage of particles of acceptable size, i.e., −6 20 Tyler standard sieve.

The granule formation step according to the invention provides a positive control on the growth of the granule since the concentrated film described previously is easily evaporated by the application of heat, causing the mechanism of agglomeration to stop, and thus permitting a positive control on the size of the granules.

According to the invention, any liquid such as water, nitrogeneous, phosphatic or potassic solutions, acids or any mixture thereof may be used.

The following substance or any mixture thereof may be agglomerated: muriate of potash, sulphate of potash, ammonium, sulphate, single superphosphate, triple superphosphate, ammonium phosphates, etc. It is, however, obvious that this process can be applied to any chemical compound which is susceptible to granulation.

In summary the essential differences between the process of the invention and the prior art are:

The formation of a concentrated film solution of uniform composition on the total surface area of all the constituent solid particles. In the prior art, the particle surfaces are only partly covered and the surface solution is of non uniform composition and concentration.

The agglomeration rate is the same for all the constituents and in a ratio corresponding to the average composition of the mixture. This is different from the prior art where the particles agglomerate at different rates and in an undetermined ratio as shown by the large variation of sizes and composition resulting from the agglomeration.

The positive control of granule size without the aid of screens whereas in the prior art only extensive screening can control the granule size.

In my process wherein there is practically 100 percent agglomeration, there is obtained a high degree of homogeneity which makes it possible to eliminate to a large extent the overformulation of the fertilizers.

Since the composition of the products produced by the process of my invention is not altered or changed even if they are allowed to segregate there is an important economy of labor costs in the trimming and the handling of the fertilizers.

Since the fertilizers are outstandingly homogenous with respect to size and chemical compositions, the sampling for analysis is much simpler.

It will be realized that in a plant production of fertilizer granules according to the process of my invention, the feeding of the dryer with 100% granular materials will result in more efficient use of fuel, not having to dry a large amount of fines. The size of the dryer could therefore be substantially reduced.

The loss of fertilizers as dusts is substantially reduced and the cost of the dust handling equipment is substantially minimized.

Other substantial economy can be realized in the size of the screening surface, the size of the cooler, of the conveyor and the handling equipment in general. The amount of fuel is also substantially reduced since a smaller liquid phase is required to achieve the agglomeration.

It is the combined action of the intensive mixing, shearing and pressing forces, applied externally to the surface of the solids and the liquid individual components of a given mixture, which provide a full and complete wetting of all these surfaces. As a result, there is produced a maximum quantity of soluble solids passing into solution in a given period of time. It is also possible that, even after two particles are adhesively bound together, there still remains large conditioned surfaces for further agglomeration.

BRIEF DESCRIPTION OF THE DRAWINGS

In the drawings which illustrate an embodiment according to the invention.

Figure 1:
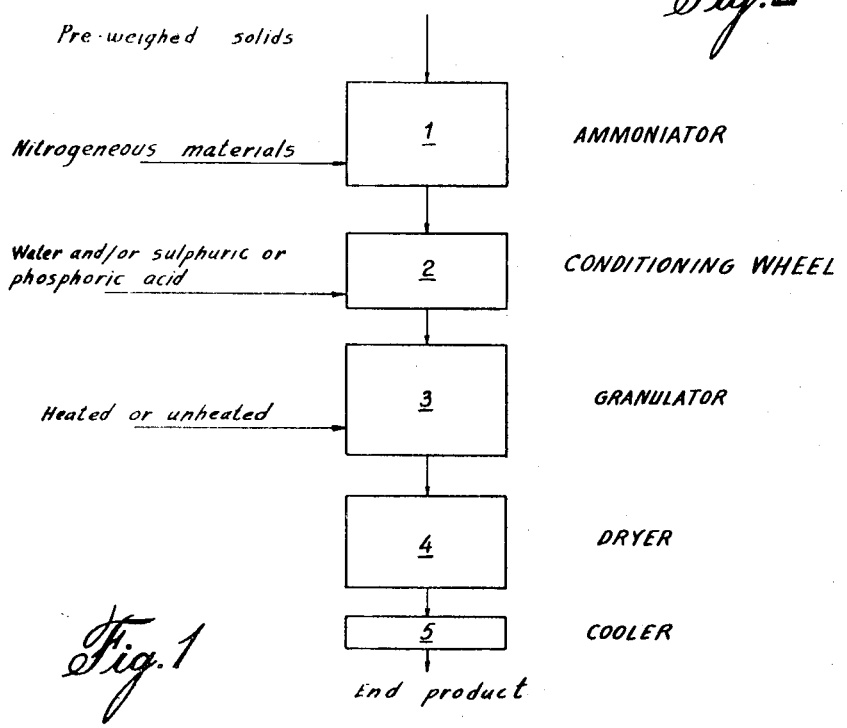
FIG. 1 is a diagrammatic illustration of the process according to the invention.

DESCRIPTION OF THE PREFERRED EMBODIMENTS:

Referring to the drawing in FIG. 1, it will be seen that preweighed solid constituents are continuously or intermittently fed into an ammoniator 1 where nitrogeneous constituents and acidic products are reacted together. The ammoniated mixture is thereafter continuously or intermittently transferred to a conditioning wheel apparatus 2 where it is submitted to the action of positive external forces of a magnitude much higher than those normally encountered in previously described commercial processes. At this stage, a liquid phase such as water solutions of nitrogeneous, phosphatic and potassic salts or an acid or any mixture thereof is added. The mixture, after having been conditioned with this liquid phase is continuously or intermittently transferred to a rotary granulator 3 where the granules grow to proper size. Finally, the granules are continuously or intermittently transferred to the dryer 4 and then to a cooler 5.

Figure 2:
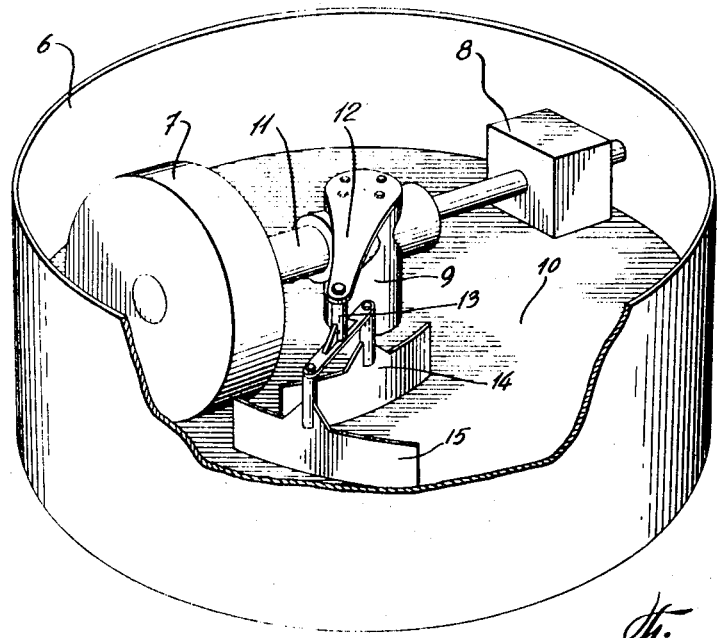
FIG. 2 depicts a conditioning wheel apparatus which can be used for superficially treating the surface of the particulate material.

The conditioning wheel apparatus according to the invention is particularly described in FIG. 2. It comprises a reservoir 6 provided with a conditioning wheel 7 which is adapted to produce a friction with the material to be treated. The actual load exerted by the wheel may be adjusted by means of the adjustable weight 8. The device also comprises a vertical shaft 9 mounted vertically in the center of the bottom surface 10 of the reservoir 6. On the upper portion of the vertical shaft 9 there is provided transversely thereof a horizontal axle 11.

The conditioning wheel 7 is freely mounted at one end of said axle and the weight 8 is adjustably mounted at the opposite end thereof.

On the top of the shaft 9 there is a bracket 12 fixedly mounted thereon to project outwardly therefrom. Secured to the outer end of bracket 12 is an inverted T-member 13 which has a pair of plows or scrapers 14 and 15 attached thereto. The material to be conditioned is kept in constant motion within the bottom surface 10 of reservoir 6 by means of the mixing plows or scrapers 14 and 15 which continuously return the material into the path of the conditioning wheel 7.

This process is suitable for the production of granules of one or any number of ingredients constituting the composition of the granules of the fertilizer. Particularly, it has been found that potash can very well be agglomerated by using the process according to the invention.

However, it is obvious that the most practical application is the production of granulated fertilizers of the N–P$_2$O$_5$–K$_2$O type in any ratio of individual raw materials.

The following table provides the comparative moisture percentages required for superficial wetting in order to achieve granulation. There are averages of two years operating conditions.

| Grade | Moisture | |
|---|---|---|
| | Invention Process, % | Prior Art, % |
| 0–20–20 | 0.7 | 5.0 (steam) |
| 0–15–30 | 1.0 | 5.5 (steam) |
| 5–20–20 | 1.2 | 4.6 |
| 6–12–12 | 2.1 | 7.4 |
| 10–10–10 | 1.7 | 6.2 |
| 10–20–20 | 4.0 | 8.4 |
| 16–8–8 | 2.3 | 5.6 |

The following examples are given to illustrate some preferred embodiments of the invention.

EXAMPLE 10–20–20

The amounts of single superphosphate, concentrated superphosphate and muriate of potash required to formulate a 0–20–20, i.e. 0% N, 20% available P$_2$O$_5$ and 20% soluble KO were submitted to intensive mixing pressures of about 40 lbs./sq. in. and rotation in the apparatus previously described above while adding about 0.7 percent water as an aid to granulation. The product obtained, after drying. had the following analysis:

| Standard Tyler Mesh | % | P$_2$O$_5$ | K$_2$O |
|---|---|---|---|
| 6 | 1.9 | 20.85 | 19.7 |
| 10 | 68.6 | 20.2 | 20.15 |
| 20 | 29.3 | 19.7 | 22.3 |
| –20 | 0.2 | | |
| Average: | | 20.0 | 20.7 |

The average analysis of fractions −6 10 mesh and −10 20 mesh of the resulting granules representing 97.9 percent of the product shows that they are within acceptable tolerances. This is a contrasting situation with that of product "A" described earlier where none of the fractions are in agreement with the average analysis.

EXAMPLE 2 5–20–10

An ammoniating solution, single superphosphate, concentrated superphosphate and muriate of potash required to formulate a 5–20–10 were mixed, reacted and treated in the apparatus described above in a manner similar to Example 1. The product obtained, after drying, had the following analysis:

Standard

| Tyler Mesh | % | N | P₂O₅ | K₂O |
| --- | --- | --- | --- | --- |
| 6 | 11.5 | 4.75 | 20.1 | 10.1 |
| 10 | 66.1 | 4.85 | 20.6 | 9.6 |
| 20 | 20.7 | 5.0 | 19.9 | 10.7 |
| −20 | 1.7 | 4.7 | 19.0 | 12.3 |
| Average: | | 4.87 | 20.37 | 9.83 |

In this second example, it will be seen that fraction 6 mesh, fraction −6 10 mesh and fraction −10 20 mesh represent 98.3 percent of the product. Each fraction is individually in agreement within the acceptable tolerances and conforms with the average analysis of the product. This product is therefore not susceptible to segregation according to its composition.

EXAMPLE 3 8–16–16

An ammoniating solution, ammonium sulphate, single superphosphate, concentrated superphosphate and muriate of potash in amounts required to formulate an 8–16–16 fertilizer were mixed, reacted and treated in the apparatus described above in a manner similar to Example 1. The product after drying, had the following analysis:

| Standard Tyler Mesh | % | N | P₂O₃ | K₂O |
| --- | --- | --- | --- | --- |
| 6 | 0.2 | — | — | — |
| 10 | 49.1 | 8.0 | 16.4 | 16.4 |
| 20 | 50.0 | 7.8 | 16.0 | 16.9 |
| −20 | 0.7 | — | — | 15.45 |
| Average: | | 7.83 | 16.05 | 16.61 |

The above results indicate that 99.1 percent of the product are within acceptable tolerances and meet the average analysis. The uniformity of the composition is also well illustrated by reference to the individual screen fractions.

I claim:

1. A process for the production of a $N-P_2O_5-K_2O$ granulated fertilizer which comprises the steps of:
   a. mixing with a liquid agent selected from the group consisting of water, nitrogenous, phosphatic, and potassic solutions at least one solid particulate material selected from the group consisting of potassic salts, nitrogenous salts, phosphatic materials and mixtures thereof, whereby said liquid agent and said particulate material form a liquid phase and a solid phase,
   b. forming a static bed of said liquid phase and said solid phase,
   c. superficially treating the surface of said particulate material while continuously mixing the same by shearing, smearing and pressing of said particulate material by the application of external forces of the magnitude within the range of 20–80 pounds per square inch to said static bed to cause only superficial wetting of the total surface of the particulate material and solubilization of soluble constituents of said particulate material, wherein the amounts of moisture to cause said superficial wetting is within the range of 0.7 – 4.0 percent of said particulate material, whereby a concentrated solution of said solid phase is formed,
   d. granulating said particulate material in the presence of heat to control the uniform growth of the granulated particles such that 85 percent of the granulated particles are within the range of 6 – 20 mesh standard Tyler sieve size, and
   e. drying and cooling the granulated material.

2. A process for the production of granulated $N-P_2O_5-K_2O$ fertilizer which comprises the steps of:
   a. mixing with a liquid agent selected from the group consisting of water, nitrogenous, phosphatic and potassic solutions, at least one solid particulate material selected from the group consisting of potassic salts, nitrogenous salts, phosphatic materials and mixtures thereof whereby said liquid agent and said solid particulate material form a liquid phase and a solid phase,
   b. superficially treating the surface of said particulate material while continuously mixing the same by shearing, smearing and pressing of said particulate material by the action of at least one rotating pressing disc entering said phases, said shearing, smearing and pressing producing positive external forces of the magnitude within the range of 20 – 80 pounds per square inch applied to the surfaces of said two phases to cause only superficial wetting of the total surface of the particulate material and solubilization of soluble constituents of said particulate material wherein the amount of moisture to cause said superficial wetting of the total surface of the particulate material is within the range of 0.7 – 4.0 percent of said particulate material, whereby a concentrated solution of said solid phase is formed,
   c. granulating said particulate materials in the presence of heat to control the uniform growth of the granulated material into particles wherein at least 85 percent of the granulated particles are within the range of 6 to 20 mesh standard Tyler sieve size, and
   d. drying and cooling the granulated material.

3. A process for the production of granulated materials which comprises:
   a. mixing at least one solid particulate material selected from the group consisting of potassic salts, nitrogenous salts, phosphatic materials and mixtures thereof with a liquid agent selected from the group consisting of water, nitrogenous, phosphatic and potassic solutions,
   b. superficially treating the surface of said particulate material while continuously mixing the same by applying thereto positive external forces of from 20 – 80 pounds per square inch to cause only superficial wetting of the total surface of the particulate material and solubilization of soluble constituents of said particulate material wherein the amount of moisture to cause said superficial wetting of the total surface of the particulate material is within the range of 0.7 – 4.0 percent of said particulate material, and
   c. granulating said particulate material in the presence of heat to control the uniform growth of the granulated particles.

\* \* \* \* \*